United States Patent
Aggarwal et al.

(10) Patent No.: US 11,138,973 B2
(45) Date of Patent: Oct. 5, 2021

(54) SYSTEMS, METHODS, AND APPARATUSES FOR MANAGING INCOMPLETE AUTOMATED ASSISTANT ACTIONS

(71) Applicant: Google LLC, Mountain View, CA (US)

(72) Inventors: Vikram Aggarwal, Palo Alto, CA (US); Moises Morgenstern Gali, San Francisco, CA (US)

(73) Assignee: GOOGLE LLC, Mountain View, CA (US)

( * ) Notice: Subject to any disclaimer, the term of this patent is extended or adjusted under 35 U.S.C. 154(b) by 171 days.

(21) Appl. No.: 16/343,948

(22) PCT Filed: Apr. 13, 2018

(86) PCT No.: PCT/US2018/027554
§ 371 (c)(1),
(2) Date: Apr. 22, 2019

(87) PCT Pub. No.: WO2019/177637
PCT Pub. Date: Sep. 19, 2019

(65) Prior Publication Data
US 2020/0302926 A1  Sep. 24, 2020

Related U.S. Application Data

(60) Provisional application No. 62/641,935, filed on Mar. 12, 2018.

(51) Int. Cl.
*G10L 15/22* (2006.01)
*G06F 3/16* (2006.01)
(Continued)

(52) U.S. Cl.
CPC ............ *G10L 15/22* (2013.01); *G06F 3/167* (2013.01); *G06F 9/542* (2013.01);
(Continued)

(58) Field of Classification Search
CPC .............. G10L 2015/223; G10L 15/22; G10L 15/1815; G10L 15/1822; G10L 15/30;
(Continued)

(56) References Cited

U.S. PATENT DOCUMENTS 6,516,251 B1 *  2/2003  Chene .................. G06F 1/1632
                                                            123/447
8,660,849 B2 *  2/2014  Gruber .............. H04M 1/72597
                                                            704/275
(Continued)

OTHER PUBLICATIONS

International Search Report and Written Opinion of PCT Ser. No. PCT/US2018/027554 dated Jul. 16, 2018.
(Continued)

*Primary Examiner* — Vijay B Chawan
(74) *Attorney, Agent, or Firm* — Middleton Reutlinger

(57) ABSTRACT

Methods, apparatus, systems, and computer-readable media are provided for resuming a partially completed action that is to be performed by an automated assistant. The action can require the automated assistant to prompt the user to provide information that the automated assistant can use to complete the action. During a dialog session in which the user is providing the information, an event can occur that interferes with the completion of the action. In response, the automated assistant can cause any information obtained during the dialog session to be stored locally, in order that the automated assistant can resume completing the action at a later time. For instance, the user can be prompted by the automated assistant to complete the action, or the user can independently invoke the automated assistant to complete the action at a time that is convenient for the user.

19 Claims, 5 Drawing Sheets

(51) Int. Cl.
*G06F 9/54* (2006.01)
*G10L 15/18* (2013.01)
*G10L 15/30* (2013.01)

(52) U.S. Cl.
CPC .......... *G10L 15/1815* (2013.01); *G10L 15/30* (2013.01); *G10L 2015/223* (2013.01)

(58) Field of Classification Search
CPC ... G10L 2015/221; G10L 13/02; G10L 15/26; G10L 2015/088; G10L 2015/228; G10L 15/28; G10L 2015/225; G10L 15/02; G10L 15/08; G10L 15/16; G10L 15/187; G10L 17/22; G10L 25/87; G06F 3/167; G06F 40/205; G06F 3/0482; G06F 3/04847; G06F 3/0488; G06F 9/542; G06N 3/0427; G06N 3/0445; G06N 3/08; G06N 5/022; G06N 7/005; H04N 21/2187; H04N 21/252; H04N 21/2668; H04N 21/4532; H04N 21/4858; H04N 21/6582
USPC ...... 704/270.1, 275, 270, 231; 715/723, 753
See application file for complete search history.

(56) References Cited

U.S. PATENT DOCUMENTS

| | | | | |
|---|---|---|---|---|
| 8,892,446 | B2* | 11/2014 | Cheyer | G10L 13/08 704/275 |
| 8,942,986 | B2* | 1/2015 | Cheyer | G06N 3/006 704/275 |
| 9,185,211 | B2* | 11/2015 | Roach | H04M 3/42382 |
| 9,201,865 | B2* | 12/2015 | Tran | G06F 40/58 |
| 9,966,065 | B2* | 5/2018 | Gruber | G10L 15/1822 |
| 10,043,516 | B2* | 8/2018 | Saddler | G10L 15/1815 |
| 10,083,688 | B2* | 9/2018 | Piernot | G10L 15/22 |
| 10,249,300 | B2* | 4/2019 | Booker | G06F 3/167 |
| 10,497,365 | B2* | 12/2019 | Gruber | H04M 3/4936 |
| 10,546,326 | B2* | 1/2020 | Publicover | H04N 21/25883 |
| 10,733,375 | B2* | 8/2020 | Li | G06N 3/08 |
| 10,733,993 | B2* | 8/2020 | Kudurshian | G10L 15/30 |
| 10,748,546 | B2* | 8/2020 | Kim | G06F 3/167 |
| 10,789,945 | B2* | 9/2020 | Acero | G10L 15/1822 |
| 2012/0290950 | A1* | 11/2012 | Rapaport | H04N 21/8358 715/753 |
| 2014/0344718 | A1* | 11/2014 | Rapaport | H04L 51/32 715/753 |
| 2016/0042735 | A1 | 2/2016 | Vibbert et al. | |
| 2016/0042765 | A1* | 2/2016 | Saini | G06F 3/04847 715/723 |
| 2017/0201779 | A1* | 7/2017 | Publicover | H04N 21/4532 |

OTHER PUBLICATIONS

Department of Transportation, Visual-Manual NHTSA Driver Distraction Guidelines for In-Vehicle Electronic Devices, Department of Transportation, National Highway Traffic Safety Administration, Docket No. NHTSA-2010-0053, Feb. 2012.

* cited by examiner

SYSTEMS, METHODS, AND APPARATUSES FOR MANAGING INCOMPLETE AUTOMATED ASSISTANT ACTIONS

BACKGROUND

Humans may engage in human-to-computer dialogs with interactive software applications referred to herein as "automated assistants," (also referred to as "chatbots," "interactive personal assistants," "assistant applications," "intelligent personal assistants," "personal voice assistants," "conversational agents," etc.). For example, humans (which when they interact with automated assistants may be referred to as "users") may provide commands, queries, and/or requests (collectively referred to herein as "queries") using free form natural language input which may be vocal utterances converted into text and then processed, and/or by typed free form natural language input.

In many cases, logical instances of automated assistants may be implemented across multiple computing devices. For example, a logical instance of an automated assistant may include an automated assistant client installed on a user's mobile phone (or other client device) and one or more cloud-based automated assistant components. The automated assistant client may be configured to provide the user with an automated assistant interface that the user can interact with to engage in a human-to-computer dialog with the automated assistant. For example, the automated assistant client can accept spoken utterances, typed inputs, and/or other inputs of the user, and can graphically and/or audibly render automated assistant responses to those inputs. However, the automated assistant client can still rely on the cloud-based automated assistant component(s) to perform various automated assistant functionalities, such as processing input(s) accepted by the automated assistant client, generating a response to the input(s) (e.g., through interaction with an agent application), etc. In some instances, the cloud-based automated assistant component can collect information from a user, in furtherance of completing an action, such as composing a message or placing an order for goods. If the action is interrupted through some event affecting the user or a participating device, the user may have to subsequently repeat the information previously provided to the automated assistant. This can waste computational resources, as such provisioning of information can require voice-to-text processing each time the user repeats the information in furtherance of completing the action. Furthermore, in response to receiving repeated requests to perform an action, the automated assistant can cause multiple server queries to be performed, resulting in a consumption of network resources and energy. This can negatively impact other processes that rely on the automated assistant and/or any device that hosts the automated assistant.

SUMMARY

The present disclosure is generally directed to methods, apparatus, and computer-readable media (transitory and non-transitory) for resuming a partially completed action that is to be performed by an automated assistant. A user can undertake multiple turns or exchanges with an automated assistant in order to cause the automated assistant to perform a particular action. However, if the user, the automated assistant, or a device through which the user is interfacing with the automated assistant is interrupted, any effort set forth to complete the action may be wasted (including client device and/or server resources) if the automated assistant cannot access information about the interrupted action after the interruption. For example, a user can request that an automated assistant send a message to a particular contact. Causing the automated assistant to send the message can require that the user provide multiple commands to the automated assistant and respond to different responses from the automated assistant. If there is an interruption during a particular response or a command, such as when the user is detailing the content of the message, the user may have to repeat the content as well as any other information previously provided in furtherance of the automated assistant sending the message. This can waste computational resources, as any device that is at least partially hosting the automated assistant would have already processed voice to text and committed some amount of memory to sending the message, only for the process to be repeated after the interruption. In order to overcome these and other issues related to such interruptions, the automated assistant can cause partially composed actions to be stored in a manner that allows them to be subsequently retrieved, modified, and/or executed after interruptions. This can help to improve the robustness of the response to interruptions, including network interruptions, which might otherwise result in inefficient usage of computational and network resources.

In some implementations, before a particular interruption or event can interfere with an interaction between a user and an automated assistant, the interruption can be qualified. For instance, the device or automated assistant can identify an event associated with an application or a separate device, and determine whether the event is worthy of interrupting the interaction between the user and the automated assistant. The event can be for example, an incoming call, an update for an application, a text message, navigation information, vehicle information (e.g., a low-fuel-level signal from a vehicle sensor) and/or any other signal that can be sent or received by a device. In some implementations, events that are worthy of interrupting the interaction can be events that are directly related to an activity being undertaken by the user at the time the event is identified. Such events can be qualified as high priority and will cause the interaction between the user and the automated assistant to be interrupted, and therefore cause data associated with the interaction to be stored, at least temporarily, until the user is willing to complete the interaction.

For example, when a user is driving their vehicle and interacting with an automated assistant that is at least partially hosted by a vehicle computing device, the vehicle computing device can identify an event. The event can be qualified as a high priority event when it is related to control of the vehicle, such as if the event is related to road hazards, vehicle maintenance, and/or an incoming call from a person whose address the user is navigating to. Therefore, if the user is directing the automated assistant to send a message, and the aforementioned event is identified by the vehicle computing device, the interaction for sending the message can be paused and stored locally as data, which can be subsequently retrieved by the automated assistant.

In some implementations, an event can be qualified as a medium priority or low priority event, and therefore will affect an interaction between the user and the automated assistant in other ways. For instance, an event can be qualified as a medium priority event when it is related to an activity being undertaken by the user and/or would potentially require the user to at least pause their activity in order to respond to the event. In some implementations, an event can be qualified as medium priority when the user is driving a vehicle and the event is associated with a text message, navigation instruction, and/or a pre-configured reminder. In some implementations, when a medium priority event is identified, the medium priority event can be presented to a user in a way that does not interrupt the interaction between the user and the automated assistant. For example, if the user is driving a vehicle and interacting with the automated assistant to order a list of items, and an event corresponding to an incoming text message is identified, a notification and/or the text message can be presented visually at a nearby computing device, such as an integrated vehicle computing device, or other portable computing device. In some implementations, a visual notification associated with the medium priority event can be presented with a message informing the user of the capability to pause the current interaction and resume it later. This puts the user on notice that they are able to ask the assistant to pause the interaction, respond or acknowledge the medium priority event, and/or resume the interaction to completion subsequently.

An event can be qualified as low priority when it is not associated with an activity being undertaken by the user, has not been given priority by the user historically, does not require a response or acknowledgement, and/or is otherwise determined to be a low priority at the time of receipt. As events are being received during an interaction between the user and the automated assistant, those events that have been qualified as low priority can be presented to the user after completion of the interaction, when the interaction has been paused by the user, or as a result of a high priority incoming signal.

In some implementations, the automated assistant can be an application that is provided on top of an operating system of a computer device, such as, but not limited to, a vehicle computing device. Therefore, there may be alerts, notifications, signal transmissions, and/or other events that are associated with a computing device. The automated assistant can create a list of such events and qualify such events to determine whether an interaction between the user and the automated assistant should be interrupted in response to the event occurring. For example, if the operating system indicates a particular message or event has priority over the assistant during an interaction, a name of the application associated with the message or event can be recorded and the message or event can be treated as high priority. In response, data corresponding to the interaction can be stored in a manner that allows it to be completed at a future time, and the interaction can then be interrupted in order to present a notification that relates to the high priority message or event.

In some implementations, an incomplete interaction can be stored in a way that allows the interaction to be completed subsequent to an interruption. For example, an incomplete interaction can be stored in a semantic representation that details data involved in each exchange, input, output, and/or any other step of the incomplete interaction. The data can identify an entity that generated the data, a type of interaction, any natural language input from the user during the interaction, slot values for functions associated with the interaction, slot identifiers for information that is needed to complete the interaction, one or more time stamps associated with the interaction, and/or any other data that can be helpful for subsequently completing the interaction after the interaction has been interrupted.

In order to resume completion of an interaction that has been previously interrupted, the automated assistant can provide a suggestion that identifies one or more interactions that have been previously interrupted. The user can then select an interaction to be completed, invoke the automated assistant to initialize completion of the interaction, and/or provide any other suitable input for causing an automated assistant to perform a particular action. For example, when the interruption is an update regarding an obstruction on the road while the user is driving, and the user has passed the obstruction or has acknowledged the update, the automated assistant can cause a visual notification to be presented at a display panel connected to a vehicle computing device. The visual notification can identify the interrupted interaction or action corresponding to the interaction, and the user can touch the visual notification in order to continue the interaction to completion. In some implementations, the interruption can be an audible notification, such as a vehicle notification (e.g., "Low fuel alert."). The audible notification can be acknowledged by the automated assistant, and, in response, the automated assistant can temporarily store data corresponding to the interaction. Thereafter, once the audible notification has completed, the automated assistant can audibly suggest that the user complete the stored interaction (e.g., "Your message to Kathy was interrupted. Would you like to continue composing the message to Kathy?")

Alternatively, the visual notification can be provided at the display panel, and the user can provide a spoken command in order to cause the automated assistant to resume the interaction (e.g., "Assistant, let's resume sending the message."). In some implementations, the automated assistant can wait until the user invokes the automated assistant at a later time and suggest resuming the previous interaction in response. For example, the user can provide an input such as, "Assistant, start playing my podcast," and, in response, the automated assistant can execute the action corresponding to the input and suggest resuming a previously stored interaction with an output such as, "Ok, I'll play the podcast . . . would you like to resume sending the message from earlier?"

In other implementations, the automated assistant can be associated with a user interface that provides a list of previously incomplete and/or complete interactions that the user can complete or repeat, respectively. For instance, if the user did not complete sending a message via the automated assistant, the interaction can be represented as a selectable icon at the user interface. When the user selects the icon, the automated assistant can retrieve the stored data corresponding to the interaction associated with the icon, and provide an output indicating a status of the interaction, missing data needed to complete the interaction, and/or any other information that can be useful for completing the interaction. If a threshold time period has transpired since an interaction was interrupted or rendered incomplete, the automated assistant can ask the user to confirm particular values associated with the interaction. For instance, if the user was attempting to send a message, the automated assistant can recite the information that the automated assistant previously received from the user in furtherance of the message, such as a name of the recipient. The automated assistant can then ask the user to provide the additional information necessary for completing the interaction, such as the contents of the message.

In some implementations, the content of the action can be used to determine when to provide a suggestion to the user regarding completing the action. For instance, the user can attempt to compose a message using voice controls while driving, but not complete the action of sending the message during the drive. The automated assistant can store information corresponding to the partially composed message, along with contextual information, and use the contextual information to generate a reminder that can be subsequently triggered during similar contexts. For instance, the next time the user begins driving, the automated assistant can acknowledge that the user is driving, compare the context to any contextual data stored with any incomplete actions, and provide suggestions when the context matches any contextual data. In this way, when the user begins to drive again, the user can be reminded of their previously incomplete action (e.g., "Last time you drove you were composing a message to Lisa. Would you like to send a message to Lisa?").

The above description is provided as an overview of some implementations of the present disclosure. Further description of those implementations, and other implementations, are described in more detail below.

In some implementations, a method may include: receiving, at one or more input components of a client device during a dialog session between a user and an automated assistant, a request for an action to be performed by the automated assistant, wherein the automated assistant is configured to complete the action based on one or more slot values obtained from the user during the dialog session; determining an activity that the user is actively engaged in during the dialog session; detecting, at the client device, an event that occurs during the dialog session; determining a measure of importance of the event to the user based at least on the activity that the user is actively engaged in during the dialog session; based on the measure of importance of the event to the user, classifying the event as an interruption to the dialog session; based on the classifying, causing the one or more slot values obtained from the user during the dialog session to be stored in memory of the client device, wherein the stored one or more slot values are subsequently retrievable from the memory by the automated assistant in furtherance of completing the action; and subsequent to classifying the event, causing the automated assistant to provide a prompt to the user regarding completing the action, wherein the prompt is based on the stored one or more slot values.

In various implementations, the method may further include: receiving, at one or more of the input components of the client device, a separate request to perform another action, wherein causing the automated assistant to provide the prompt includes generating a response to the separate request, wherein the response to the separate request identifies the action as a reminder to complete the action. In various implementations, at least part of the automated assistant is implemented on a server device that is accessible to the client device over a network connection.

In various implementations, the one or more slot values obtained from the user includes a natural language input received at an automated assistant interface of the client device, and the prompt identifies at least a portion of the natural language input. In various implementations, the prompt is presented at a graphical user interface rendered on a display of the client device and includes a list of previously incomplete actions originating from previous dialog sessions between the user and the automated assistant.

In various implementations, the activity comprises driving, the client device comprises an in-vehicle computing device, and determining the measure of importance of the event to the user includes determining that the event relates to driving. In various implementations, the information is stored in a list with other information corresponding to other incomplete actions resulting from other dialog sessions.

In another aspect, a method may include: receiving data corresponding to a dialog session between a user and an automated assistant that occurs while the user is driving the vehicle, wherein the data corresponds to slot values for an action to be performed by the automated assistant, and the user interacts with the automated assistant via an automated assistant interface of the in-vehicle computing device; classifying an event that occurs during the dialog session based on a measure of importance of the event to operation of the vehicle by the user; based on the event being classified as an interruption to the dialog session occurring between the user and the automated assistant: at least temporarily stopping the dialog session from continuing, and causing the slot values for the action to be stored at the client device as a set of data that further identifies missing parameters needed to complete the action, wherein the set of data is configured to be subsequently retrieved in furtherance of completing the action; subsequent to at least temporarily stopping the dialog session from continuing, causing the client device to provide a suggestion output that identifies the action, wherein the suggestion output is based on the stored set of data.

In various implementations, the method may further include: receiving a user input directing the automated assistant to further the action to completion; and generating, in response to receiving the user input, a user prompt that identifies one or more of the missing parameters. In various implementations, classifying the event is further based on a source of the event. In various implementations, causing the slot values for the action to be stored at the client device as the set of data includes causing the set of data to be stored with other sets of data corresponding to incomplete actions initialized via the automated assistant.

In various implementations, the set of data includes an amount of time that has transpired since the event occurred, or a time stamp that identifies when the event occurred. In various implementations, the suggestion output is provided through a separate automated assistant interface than the automated assistant interface through which the user interacted with the automated assistant. In various implementations, the automated assistant is accessible through a network connection and the event corresponds to a disconnection of the client device from the network connection.

Other implementations may include a non-transitory computer readable storage medium storing instructions executable by one or more processors (e.g., central processing unit(s) (CPU(s)), graphics processing unit(s) (GPU(s)), and/or tensor processing unit(s) (TPU(s)) to perform a method such as one or more of the methods described above and/or elsewhere herein. Yet other implementations may include a system of one or more computers and/or one or more robots that include one or more processors operable to execute stored instructions to perform a method such as one or more of the methods described above and/or elsewhere herein.

It should be appreciated that all combinations of the foregoing concepts and additional concepts described in greater detail herein are contemplated as being part of the subject matter disclosed herein. For example, all combinations of claimed subject matter appearing at the end of this disclosure are contemplated as being part of the subject matter disclosed herein.

DETAILED DESCRIPTION

Figure 1:
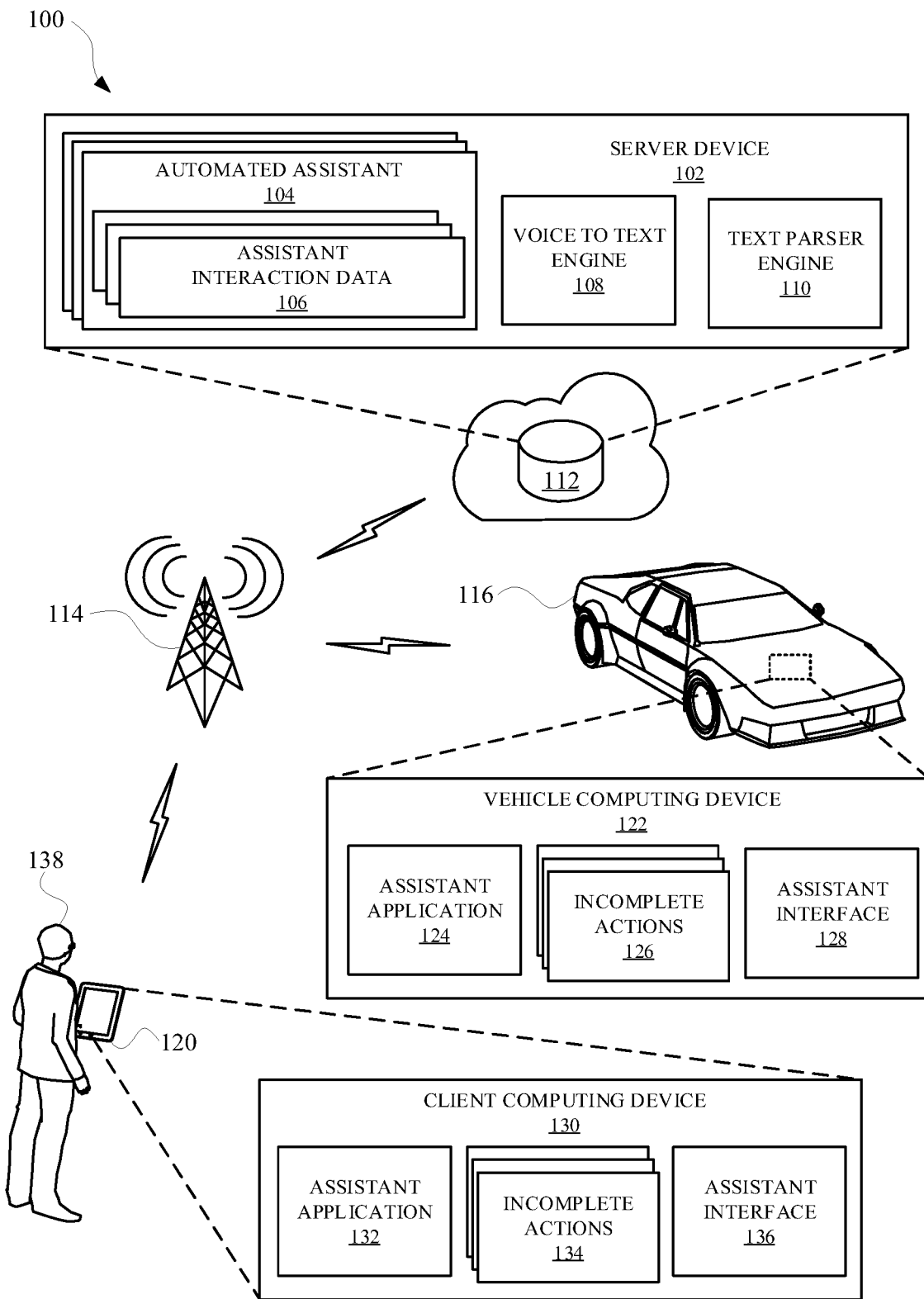
FIG. 1 illustrates a system for enabling an action being performed by an automated assistant to be interrupted and resumed at a later time.

FIG. 1 illustrates a system 100 for enabling an action, being performed by an automated assistant 104, to be interrupted and resumed at a later time. The automated assistant 104 can operate as part of an assistant application 132 and/or assistant application 124 that is provided at one or more computing devices, such as a client computing device 130 (e.g., a table device 120), a vehicle computing device 122 that is connected to or integral to a vehicle 116, and/or a remote computing device 112, such as a server device 102. A user 138 can interact with the automated assistant 104 via an assistant interface 136, which can be a microphone, a camera, a touch screen display, a user interface, and/or any other apparatus capable of providing an interface between a user and an application. For instance, a user can initialize the automated assistant 104 by providing a verbal, textual, or a graphical input to the assistant interface 136 to cause the assistant application 132 and/or automated assistant 104 to perform a function (e.g., provide data, control a peripheral device, access an agent, etc.). The client computing device 130 can include a display device, which can be a display panel that includes a touch interface for receiving touch inputs and/or gestures for allowing a user to control applications of the client computing device 130 via the touch interface. In some implementations, the client computing device 130 can lack a display device, but provide an audible user interface output, without providing a graphical user interface output. Furthermore, the client computing device 130 can provide a user interface, such as a microphone, for receiving spoken natural language inputs from a user.

The client computing device 130 and/or the vehicle computing device 122 can be in communication with the remote computing device 112 over a network 114, such as the internet. The client computing device 130 and/or the vehicle computing device 122 can offload computational tasks to the remote computing device 112 in order to conserve computational resources at each of the client computing device 130 and/or the vehicle computing device 122. For instance, the remote computing device 112 can host the automated assistant 104, and the client computing device 130 and/or the vehicle computing device 122 can transmit inputs received at one or more assistant interfaces to the remote computing device 112. However, in some implementations, the automated assistant 104 can be at least partially hosted at the client computing device 130 and/or the vehicle computing device 122. In various implementations, all or less than all aspects of the automated assistant 104 can be implemented on the client computing device 130 and/or the vehicle computing device 122. In some of those implementations, aspects of the automated assistant 104 are implemented via a local assistant application (i.e., the assistant application) of the client computing device 130 and/or the vehicle computing device 122 and interface with the remote computing device 112 that implements other aspects of the automated assistant 104. The remote computing device 112 can optionally serve a plurality of users and their associated assistant applications via multiple threads. In implementations where all or less than all aspects of the automated assistant 104 are implemented via a local assistant application of the client computing device 130 and/or the vehicle computing device 122, the local assistant application can be an application that is separate from an operating system of the client computing device 130 and/or the vehicle computing device 122 (e.g., installed "on top" of the operating system) or can alternatively be implemented directly by the operating system of the client computing device 130 and/or the vehicle computing device 122 (e.g., considered an application of, but integral with, the operating system).

In some implementations, the remote computing device 112 can include a voice to text engine 108 that can process audio data received at an assistant interface to identify the text embodied in the audio data. The process for converting the audio data to text can include a speech recognition algorithm, which can employ neural networks, word2vec algorithms, and/or statistical models for identifying groups of audio data corresponding to words or phrases. The text converted from the audio data can be parsed by a text parser engine 110 and made available to the automated assistant 104 as textual data that can be used to generate and/or identify command phrases from the user, a third party application, and/or a third party agent.

The user 138 can participate in dialog sessions with the automated assistant 104 in order to cause the automated assistant 104 to perform particular actions that may require additional information from the user 138. For instance, the user 138 can initialize a dialog session via an assistant interface 128 of the vehicle computing device 122 while driving the vehicle 116. The dialog session can be initialized when the user 138 provides a natural language input such as, for example, "Assistant, please perform [action]." In response, the assistant application 124 can transmit data, corresponding to the natural language input, to the server device 102 for further processing. The automated assistant 104 at the server device 102 can determine the action the user 138 intends the automated assistant 104 to perform, and, in response, provide the assistant application 124 with additional data for completing the action. Such additional data can identify slot values and/or parameters that the user 138 needs to provide in order for the automated assistant 104 to complete the action. Alternatively, the automated assistant 104 can be hosted at the vehicle computing device 122 and/or the client computing device 130, and can therefore determine at least some of the slot value and/or parameters that the user 138 needs to provide without the automated assistant 104 communicating with the server device 102. The automated assistant 104 can use the slot values and/or parameters in order to generate a response for the user 138 in furtherance of the dialog session and completing the action.

The response to the user 138 can be a natural language output provided from the assistant interface 128. For instance, when the assistant interface 128 is an audio subsystem of the vehicle computing device 122 and the action is message-related action, the natural language output can be, "Ok, what would you like the content of the message to be?" If the user 138 provides the content for the message, the automated assistant 104 can store the message content as assistant interaction data 106, which can be stored at the server device 102, the vehicle computing device 122, and/or the client computing device 130. At this time during the dialog session, the user 138, vehicle computing device 122, and/or the automated assistant 104 can experience an interruption.

The interruption can be a notification from a separate application, receipt of data associated with an activity being performed by the user 138, a signal being sent or received from the vehicle computing device 122, the client computing device 130, and/or the server device 102, an alert or signal raised by one or more vehicle sensors, and/or any other event that can be associated with the user 138. It should be noted that, although the user 138 is depicted in FIG. 1 as being outside the vehicle 116, for purposes of some examples, the user 138 can be inside the vehicle 116 interacting with the assistant application 124 while driving or participating in another activity. The event can be qualified by the assistant application 124 in order to determine whether the dialog session or action should be paused for resuming later. For instance, the event can be qualified by an event qualifying engine that is integral to, or otherwise accessible by, the automated assistant 104. For example, the event qualifying engine can be hosted, in part or full, at the vehicle computing device 122, the client computing device 130, and/or the server device 102.

The event qualifying engine can determine a measure of importance or relevance between the event and an activity in which the user 138 is participating (e.g., a priority of the event). Furthermore, the measure of importance or relevance can be generated as a value that can be compared to a threshold to determine whether to pause a particular action or dialog session. For instance, when the user 138 is driving and participating in a dialog session in furtherance of an action, an event corresponding to a notification can occur. The notification can be presented at the vehicle computing device 122 and announce that there is an obstruction in the road. Such an event can be qualified by the event qualifying engine as a value that satisfies the threshold (e.g., high priority) and therefore will cause the action or dialog session to be paused. Other types of events that would likely qualify as high priority include, but are not limited to, critical events raised by sensors of the vehicle itself (e.g., flat tire, overheating, malfunction of one or more vehicle lights, door ajar, etc.), severe weather alerts, road closures, etc. Alternatively, the event can be qualified by the event qualifying engine as a value that does not satisfy the threshold (e.g., medium or low priority), and therefore will not cause the action or dialog session to be paused. Such events can include an incoming text message that is unrelated to the activity of the user 138, a phone call that is unrelated to the activity, a notification regarding a software update, a non-critical event raised by vehicle sensors (e.g., low tire pressure, time for oil change, low gas, etc.), and/or any other event that can be qualified as having little to no relevance to an activity being performed by the user 138.

In some implementations, an event that occurs during a dialog session can be a loss of signal, for instance, when a user 138 is driving their vehicle 116 through a tunnel or in an area where there are issues with network connectivity. In such instances, the loss of signal or network connectivity can be qualified by the event qualifying engine as a value that satisfies the threshold for interrupting a dialog session. In response to a qualifying event occurring during the dialog session, the automated assistant 104, either at the server device 102 or a client device (e.g., the vehicle computing device 122 and/or the client computing device 130) can generate data from which the dialog session or action can be resumed. Additionally, the dialog session can be paused until the event has stopped or is no longer qualified as an interrupting event (e.g., when signal returns to normal). In some implementations, the suggestion for resuming the dialog session can be generated offline and/or when the network connectivity is still unavailable. For instance, the data generated in response to the interruption can be stored locally at a client device, and, after the interruption, the client automated assistant can access the stored data in order to provide a suggestion for the user to complete the interaction.

The data generated in response to an interruption by a qualifying event can be stored as an incomplete action 126 and/or an incomplete action 134. For instance, if the event occurred while the user 138 was driving the vehicle 116, the data can be stored as an incomplete action 126 at the vehicle computing device 122. Thereafter, when the event is no longer occurring, the user 138 can elect to resume the incomplete action 126 by providing an input to the assistant interface 128. The input can be a spoken natural language input such as, "Assistant, resume the previous action." In response, the assistant application 124 can access the data that was stored in response to the interruption and identify any missing slot values or parameters necessary for completing the action. For instance, when the action is message-related, a missing slot value can be a name of a recipient. Therefore, the assistant application 124 can generate a response that is based on the data, such as, "Ok, please provide a recipient for your message." If the assistant application 124 receives all the parameters and/or slot values needed to complete the action, the assistant application 124 can complete the action using the stored data, as well as the information received from the user during the dialog session that occurred after the interrupting event.

In some implementations, data stored in response to an interruption to a dialog session can be shared with multiple different computing devices that are associated with a user 138. For example, the user 138 can be operating the client computing device 130 and participating in a first dialog session with the assistant application 132. The user 138 can be directing the assistant application 132 to perform a particular action during the dialog session, and provide information to the assistant application 132 for completing the action. The information can be stored as a semantic representation of the interaction between the user 138 and the assistant application 132, in order that the assistant application 132 can subsequently retrieve the stored information in furtherance of completing the action during a second dialog session.

In some implementations, in response to the first dialog session being interrupted, the assistant application 132 can store the information obtained during the first dialog session at the client computing device 130 and transmit the information to the server device 102 and/or the vehicle computing device 122. For instance, when the action to be performed corresponds to a message to be sent, the assistant application 132 can generate data such as, "Action: message; Content: "What time are we meeting?"; Recipient: [null]; Confirmed: [null]; Time_Initiated: 3:32:40 8-4-17." The data can indicate when the user initiated the action, the type of action that was initiated, as well as any parameters that are missing (e.g., missing parameters can have a "null" value). In this way, any other automated assistant that accesses the data from another device will be able to generate prompts for the user 138 in order to obtain additional information to satisfy the missing parameters. For instance, if the user 138 seeks to participate in a second dialog session for completing the message action, the user 138 can invoke the assistant application 124 while driving the vehicle 116 and tell the assistant application 124, "Assistant, let's complete the message from before." In response, the vehicle computing device 122 can access the data that originated at the client computing device 130 so that the assistant application 124 can generate prompts necessary to obtain further information from the user 138 for completing the action.

Figure 2A:
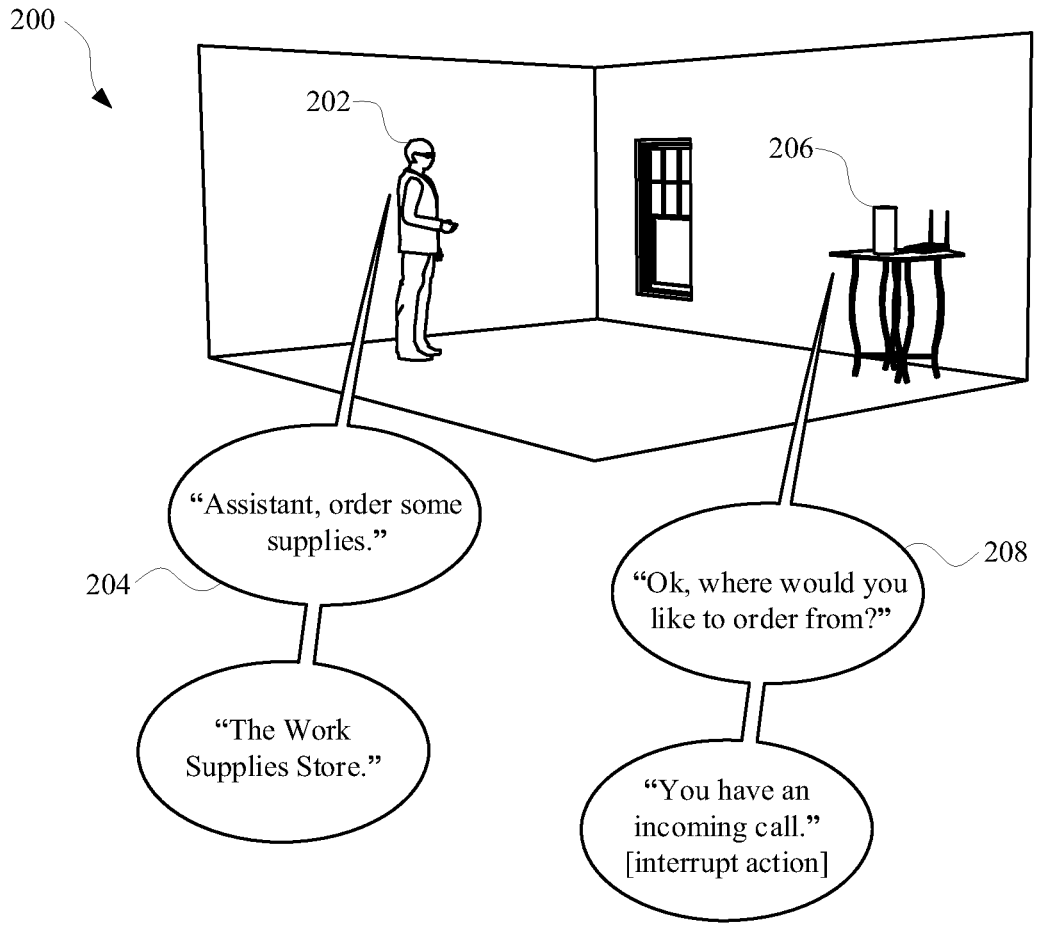
FIGS. 2A and 2B illustrate perspective views of a user participating in dialog sessions for purposes of causing an automated assistant to complete an action.
Figure 2B:
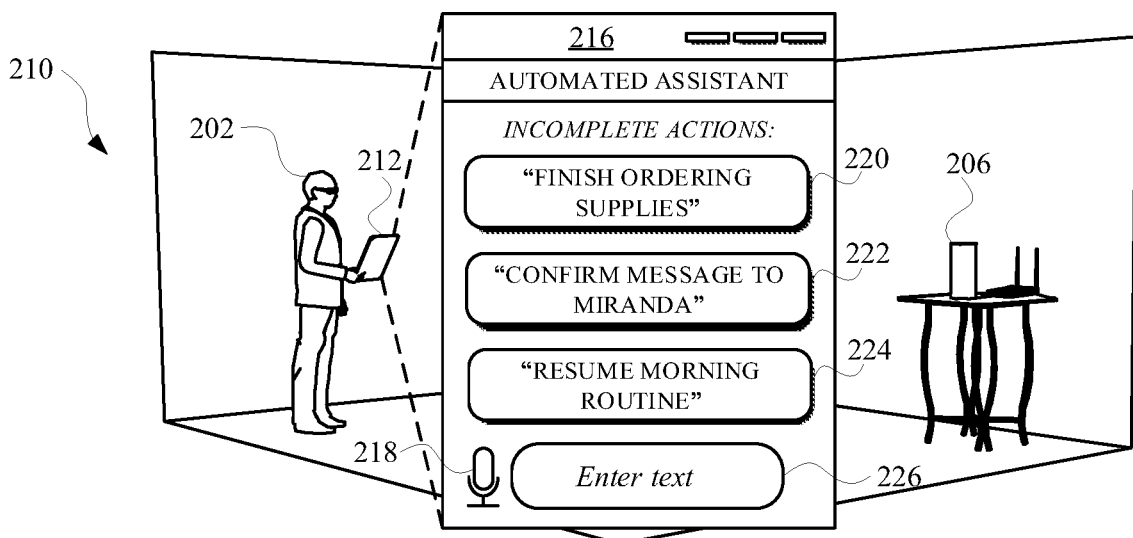

FIGS. 2A and 2B illustrate perspective views 200 and 210 of a user 202 participating in dialog sessions for purposes of causing an automated assistant to complete an action. Specifically, FIG. 2A provides a perspective view 200 of a user initializing a dialogue session for the automated assistant to complete an action, and the action being interrupted by a particular event. FIG. 2B illustrates a perspective view 210 of a user 202 electing to resume the action after the interrupting event has occurred. As provided in FIG. 2A, the user 202 can initialize a first dialogue session with an automated assistant via an automated assistant device 206. The automated assistant device 206 can be a computing device that includes an assistant interface, such as an audio subsystem that includes a microphone and a speaker. The user 202 can initialize the first dialogue session with the automated assistant by providing a spoken natural language input 204, such as "Assistant, order some supplies." In response, the automated assistant can be invoked at the automated assistant device 206, and the automated assistant can identify an action to which the user is referring. The automated assistant can identify the action by comparing text generated from the spoken natural language input 204 to a stored table of actions capable of being performed by the automated assistant. For instance, because the user 202 spoke the word "order" in their dialogue, the automated assistant can determine that the user 202 is intending to place an order. The action of placing an order can be associated with a function that requires one or more parameters to complete. For example, the parameters can include a source for the order, a number of items, an identifier for an item, and a confirmation from the user 202.

The automated assistant can generate a response for the user 202 based on the parameters needed to complete the action. For example, the automated assistant can generate a natural language output that can be provided from the assistant interface, and the natural language output 208 can include dialog such as, "Okay, where would you like to order from?" This response can be part of the initial dialogue session, and the user can reply to the automated assistant by providing an answer such as, "The Work Supplies Store." At this point during the first dialog session, the automated assistant can determine that an event has occurred, which will interrupt the first dialogue session. For example, the automated assistant can determine that an incoming call is being received at the assistant device, and in response, can provide a natural language output 208 such as, "You have an incoming call." Furthermore, in response to determining that the event has occurred, the automated assistant can qualify the event or otherwise determine whether the event should cause the action to be paused. When the automated assistant determines that the action should be paused, the automated assistant can store any information obtained from the user during the dialog session at the assistant device 206, and/or any other device that can be associated with the user or an account of the user 202. For example, the automated assistant can store the information corresponding to the source for the items to be ordered, a timestamp corresponding to a time when the user initialized the action, and/or any other information that can be associated with completing the action.

FIG. 2B illustrates a perspective view 210 of the user 202 accessing a graphical user interface 216 of a computing device 212 in order to initialize completion of the action that the user 202 previously started during the first dialogue session. Specifically, the user 202 can initialize a second dialog session with the automated assistant through the computing device 212. When a user 202 accesses an application corresponding to the automated assistant, the user 202 can be presented with a graphical user interface 216, which can include multiple different selectable elements. The selectable elements can correspond to different incomplete actions that the automated assistant previously began, but did not complete. Therefore, in response to the user accessing the automated assistant at the computing device 212, the automated assistant can access a data storage that includes data identifying incomplete actions and/or parameters that the user needs to provide in order to complete the incomplete actions.

The missing parameters can be used to generate text that can be presented at each selectable element. For example, a first selectable element 220 can be presented at the graphical user interface 216 based on data that was stored in response to the interrupting event from FIG. 2A. Specifically, the text can include, "Finish ordering supplies." The text can put the user 202 on notice that they previously initialized an action for ordering supplies but did not finish the order. Furthermore, the graphical user interface can include a microphone icon 218 and/or a dialog box 226, which can indicate different modalities through which the user 202 can interact with the automated assistant. In this way, the user 202 can be put on notice that they can initialize completion of the action of ordering supplies by speaking the text provided at the first selectable element 220 into the assistant interface of the assistant device 206.

The graphical user interface can also identify other incomplete actions in the list of actions. For instance, the graphical user interface can include a second selectable icon 222 that identifies a current incomplete action, in which the user 202 began composing a message to be sent to a recipient named "Miranda." The graphical user interface can further include a third selectable element 224 that identifies a current incomplete action associated with a morning routine. For instance, the user 202 can request the automated assistant perform a particular morning routine that requires certain responses from the user 202, and involves the automated assistant performing multiple actions. However, if the routine is interrupted by a qualifying event, the automated assistant can store any information obtained from the user during the uninterrupted portion of the routine, and provide the third selectable element 224 based on the stored information. In this way, the user 202 can elect to initialize a subsequent dialog session in furtherance of completing the routine by selecting the third selectable element 224.

Figure 3:
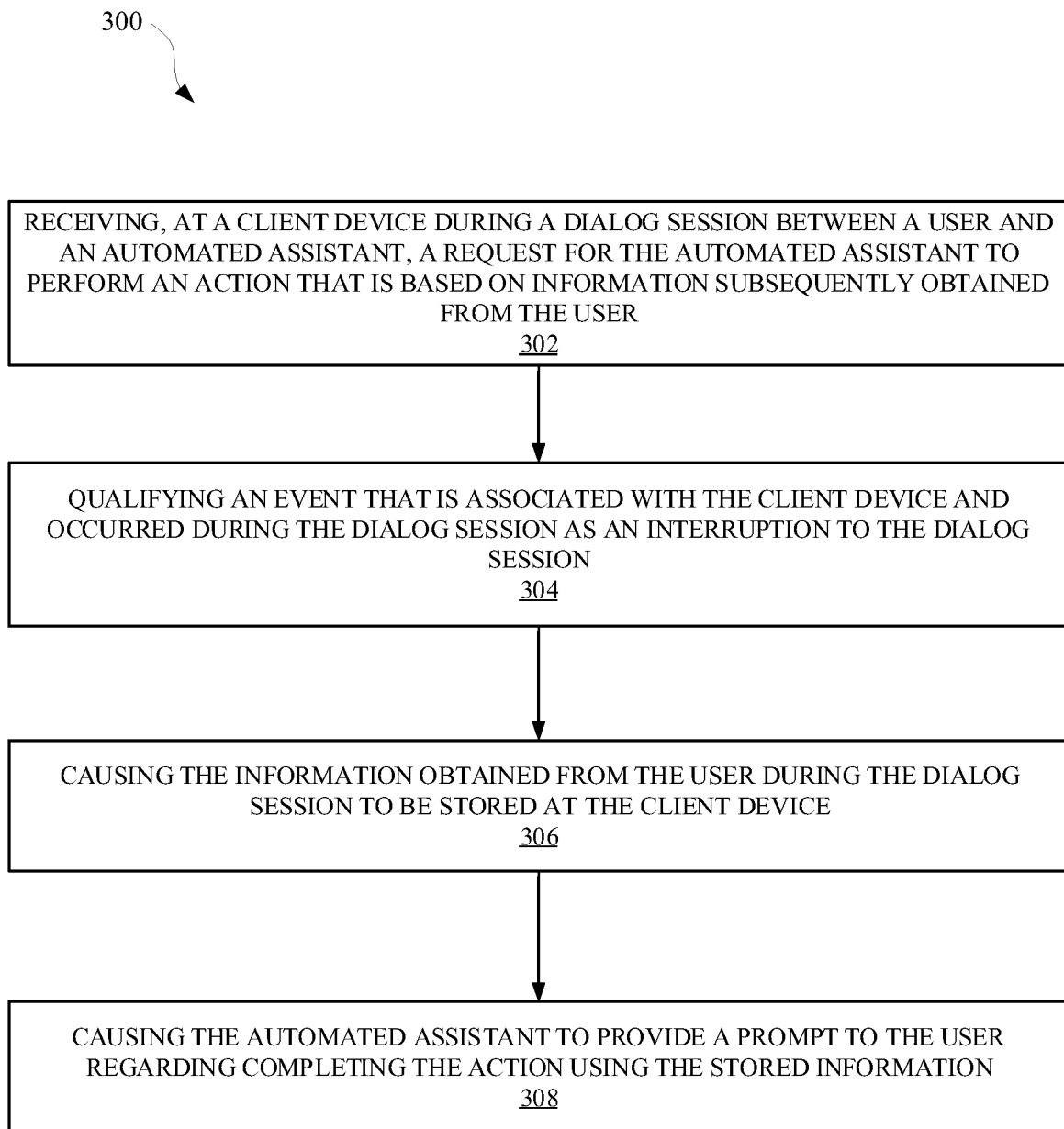
FIG. 3 illustrates a method for allowing a user to store an incomplete action to be performed by an automated assistant.

FIG. 3 illustrates a method 300 for providing a route for a user to complete a previously interrupted action that would be performed by an automated assistant. The method 300 can be performed by one or more computing devices, applications, and/or any other apparatus or module capable of interacting with an automated assistant. The method 300 can include an operation 302 of receiving, at a client device during a dialog session between a user and an automated assistant, a request for the automated assistant to perform an action that is based on the information subsequently obtained from the user. The client device can include an automated assistant interface through which the user can participate in a dialog session with the automated assistant. For instance, the automated assistant interface can be an audio system that includes a microphone and speaker, and the request can correspond to a natural language input received at the microphone from the user. The natural language input can be, for example, "Assistant, send a text message." The natural language input can be transmitted from the client device to a remote device for converting to text, and mapping to a particular action to be performed by the automated assistant. The action can be a "message" action, which can require that automated assistant to prompt the user for additional information, such as the body of the message, recipient of the message, and/or confirmation to send the message. In response to receiving the request, the automated assistant can prompt the user for the additional information, thereby continuing the dialog session. For example, the automated assistant can cause an output to be provided from the speaker, such as "Ok, what would you like the message to say?" During the dialog session, an event can occur that interrupts the dialog session.

The method 300 can include an operation 304 of qualifying an event that is associated with the client device and/or the user, and occurred during the dialog session as an interruption to the dialog session. Qualifying the event can including determining a measure of importance of the event to the user based on an activity that the user is actively participating in during the dialog session. For example, the measure of importance can be a value that is assigned to an identifier for the event, and when the value satisfies a particular threshold, the event can be qualified as an interruption to the dialog session. The value can be higher for events that correspond to information being provided to the user in furtherance of the activity, such as when the activity is driving and the event is the client device providing the user with information about an upcoming obstacle in the road. The aforementioned value can be higher relative a value that is assigned to an identifier for an event such as when the user receives a text message that includes content unrelated to the destination of the user when the user is driving.

The method 300 can further include an operation 306 of causing the information obtained from the user during the dialog session to be stored at the client device. The operation 306 can be performed in response to the event being qualified as an interruption, or, in some implementations, when a value corresponding to a measure of importance of the event satisfies a threshold. The information can be stored locally at the client device in a way that allows the automated assistant to subsequently retrieve the stored information in furtherance of completing the action at a later time. For example, when the event is over, and the value assigned to the event no longer satisfies the threshold, the automated assistant can optionally use the stored information during a subsequent dialog session in order to complete the action. In some implementations, the information obtained during the previous dialog session can be stored with slot values for a function corresponding to an action, such as sending a message. In some implementations, the stored information can include parameters that require slot values in order to execute the function corresponding to the action. For instance, during the previous dialog session, the user may have provided content for the message but not a recipient or a confirmation to send. Therefore, the information stored can identify an empty parameter for the recipient and an empty parameter for the confirmation to send.

The method 300 can also include an operation 308 of causing the automated assistant to provide a prompt to the user regarding completing the action using the stored information. The prompt can be provided subsequent to the event being qualified, during the event, and/or after the event has completed. For instance, if the event corresponds to a notification regarding road conditions, the prompt can be provided in response to the user acknowledging the notification or after a threshold time period after the notification. In some implementations, the prompt can be provided in response to the user initializing a subsequent dialog session with the automated assistant. The prompt can include, or be based on, the previously stored information. For instance, when the interrupted action corresponds to a previous attempt of the user to send a message via the automated assistant, the stored information can include data about the message. In this way, the user can quickly recognize the previous incomplete action from the prompt and elect to continue the action by selecting the prompt. In some implementations, the prompt can be a natural language output provide through an audio modality, video modality, and/or any other modality through which an automated assistant can communicate with a user. By selecting the prompt, or otherwise providing an indication of a willingness to complete the action, the automated assistant can, in response, generate a query for obtaining, from the user, any missing information needed to complete the action. For example, in response to the user selecting the prompt, the automated assistant can provide a natural language output such as, "Ok, who would you like to send the message to?"

In some implementations, the prompt can be provided at a graphical user interface and include a list of multiple previous actions that were not completed. In this way, the user can be reminded of the incomplete actions and elect to complete one or more of the incomplete actions. For example, if the incomplete actions include multiple incomplete messages, the user can elect to complete multiple incomplete messages. The user can provide an input to the automated assistant for initializing another dialog session for completing the incomplete messages, and, in response, the automated assistant can access stored information corresponding to the incomplete messages. The automated assistant can then generate natural language outputs for soliciting the user to provide the information needed to complete the incomplete messages. Such outputs can include an audible output such as, "Ok, please confirm the following message content [message content] and provide a recipient . . . please also confirm this other message content [different message content] and provide a recipient." In this way, the user can be provided with a sequence requests for information to complete previously incomplete actions, without necessarily going back and forth multiple times between a prompt at a graphical user interface and speaking to an audio interface.

In some implementations, the event can be direct instructions from the user to pause a particular action. For instance, the user can provide a spoken input to an audio interface of the client device such as, "pause this action." The aforementioned spoken input can be provided during the initial dialog session where the user initially requested that the action be performed. In response to receiving the spoken input, the automated assistant can stored any information related to the action locally at the client device. Thereafter, the user can request to be prompted with any previously incomplete actions (e.g., "Assistant, show me my incomplete actions.") or merely speak the phrase, "resume the previous action," in order to initialize completing the incomplete action. In response, the automated assistant can access the stored information and provide a response to the user that is based on the stored information.

Figure 4:
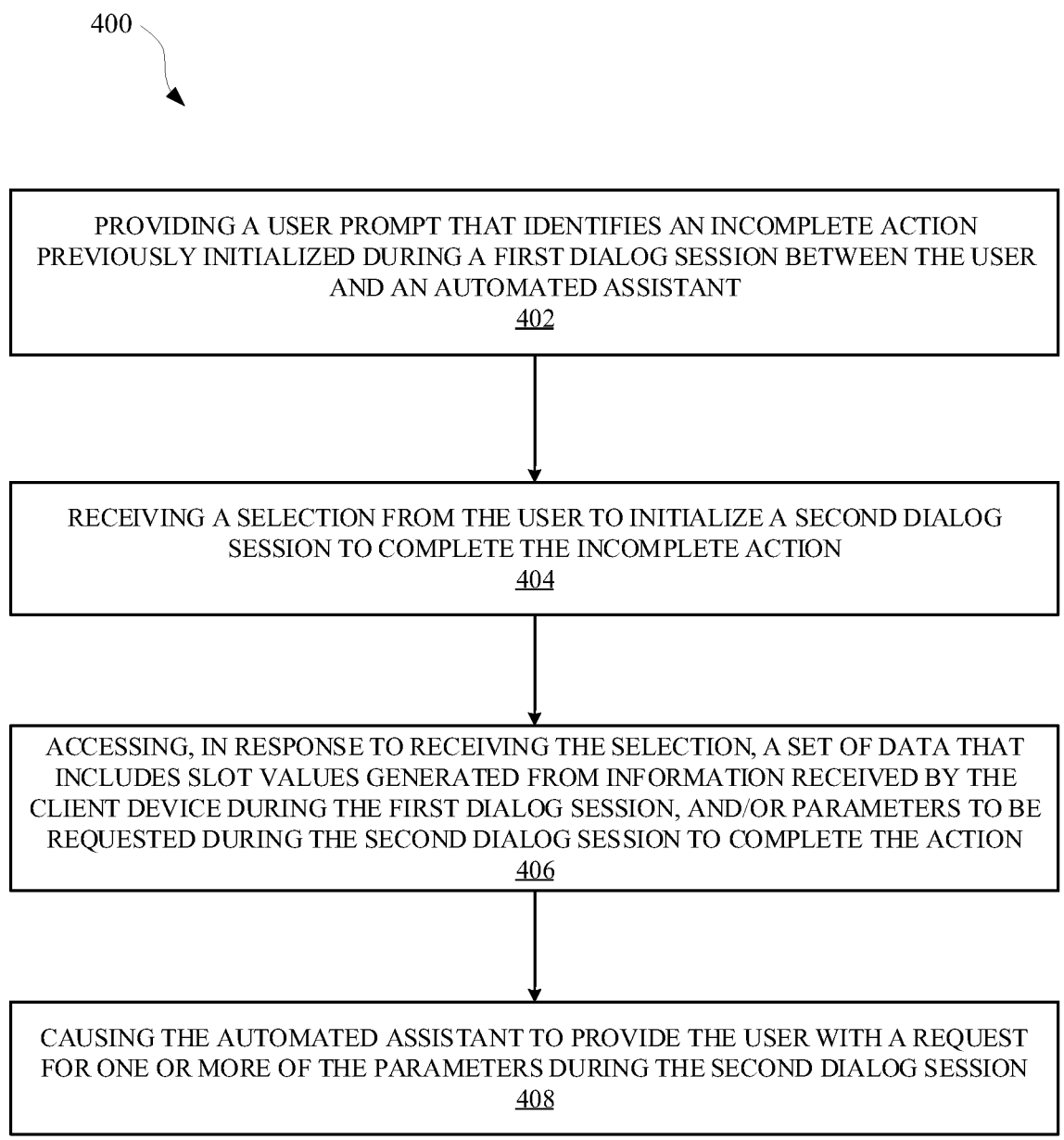
FIG. 4 illustrates a method for resuming a previously incomplete action to be performed by an automated assistant.

FIG. 4 illustrates a method 400 for resuming a previously incomplete action to be performed by an automated assistant. The method 400 can be performed by one or more computing devices, applications, and/or any other apparatus or module capable of interacting with an automated assistant. The method 400 can include an operation 402 of providing a user prompt that identifies an incomplete action previously initialized during a first dialog session between the user and an automated assistant. A dialog session can be an interaction between one or more users and one or more automated assistants, and can be performed through one or more modalities of communication such as speech, text, gesture, and/or any other modality of communication. The user prompt can be provided through an automated assistant interface of a client device that at least partially hosts the automated assistant or interacts with the automated assistant over a network connection with a remote device, such as a server. For instance, the user prompt can be a graphical user interface icon that is presented at a display panel of the client device. The prompt can identify one or more previously incomplete actions, in order to put the user on notice of their ability to complete previously initialized actions, in order to eliminate the need for the user to provide the same information to the automated assistant.

The method 400 can further include an operation 404 of receiving a selection from the user to initialize a second dialog session to complete the incomplete action. The selection can be received via an automated assistant interface of the client device and can identify a particular incomplete action. Furthermore, in response to receiving the selection, the second dialog session between the user and the automated assistant can be initialized. The second dialog session can be conducted via an interface through which the user participated in the first dialog session, at least based on stored information corresponding to the incomplete action. For instance, the stored information can identify a device, an interface, a modality, and/or any other information associated with a means of communication through which the user participated in the first dialog session. Alternatively, the second dialog session can be initialized through the same device at which the user selected the incomplete action.

The method 400 can also include an operation 406 of accessing, in response to receiving the selection, a set of data that includes slot values generated from information received by the client device during the first dialog session, and/or parameters to be requested during the second dialog session to complete the action. The set of data can be defined by, or at least be part of, the stored information that was generated when the first dialog session was interrupted by a particular event, or was otherwise caused to end. Furthermore, the set of data can include information that was provided by the user during the first dialog session, and/or other data retrieved by the automated assistant in furtherance of the action. For example, the set of data can define one or more slot values for satisfying a function associated with the action. The action can be ordering an item through the automated assistant and the function can correspond to a backend script that is executed to complete the action. Therefore, the slot values can be, for example, a number of items to order, a description of the item to order, and/or a confirmation of the order. The set of data can optionally define parameters to be requested during the second dialog session to complete the action. The parameters can be any values that are still needed by the function in order to complete the action. For instance, if the user has not confirmed the order, the parameters can include a value "function: order item; confirmed: null," indicating that the confirmation has not been received. The automated assistant can identify the parameter that is missing and generate an output for the user during the dialog session, requesting a value for the missing parameter.

The method 400 can further include an operation 408 of causing the automated assistant to provide the user with a request for one or more of the parameters during the second dialog session. The request can be provided via an automated assistant interface of the client device and include natural language content such as, for example, "Please confirm your order of one item." The aforementioned content can be based on the stored set of data that identifies the "confirmed" parameter as being null, or otherwise not including a slot value. The automated assistant can provide one or more requests during the dialog session based on how many parameters need to be defined in order to complete the action. For instance, if the user had not provided a number of items to order during the first dialog session, the set of data can include a value "function: order item; number of items: [null]." The automated assistant can access the set of data and generate a request that includes content such as, for example, "Please provide a 'number of items' for your item order." The user can provide a response that defines the number of items to order, and, if all the parameters for completing the action are complete, the automated assistant can cause the action to be performed and, for example, the item to be ordered. If the second dialog session is interrupted by a qualifying event, the stored set of data can be updated to include any additional information that was obtained during the second dialog session. The user or the automated assistant can subsequently initialize completion of the action at a later time, without having to provide the same information provided during the first dialog session and the second dialog session.

Figure 5:
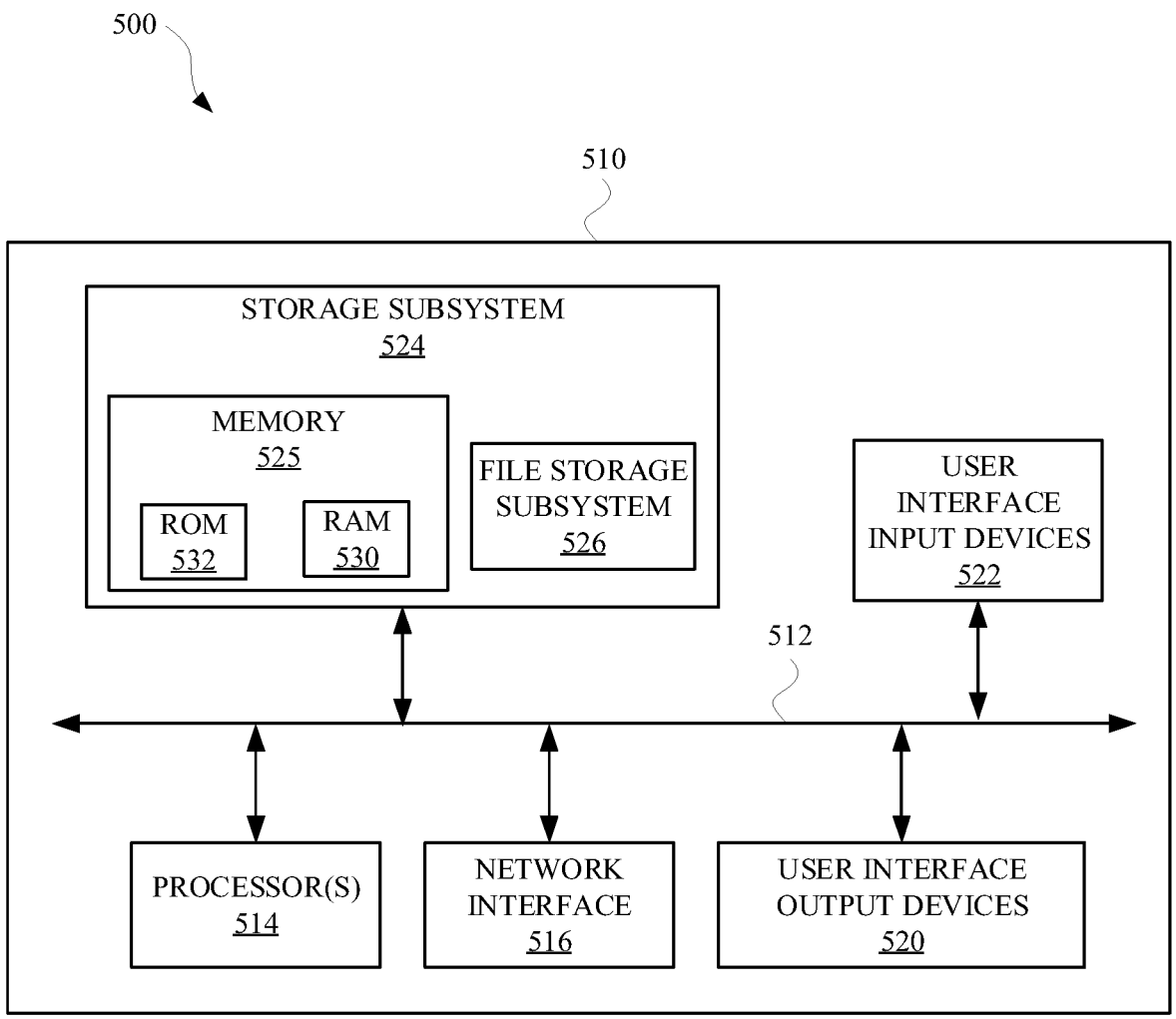
FIG. 5 is a block diagram of an example computer system.

FIG. 5 is a block diagram 500 of an example computer system 510. Computer system 510 typically includes at least one processor 514 which communicates with a number of peripheral devices via bus subsystem 512. These peripheral devices may include a storage subsystem 524, including, for example, a memory 525 and a file storage subsystem 526, user interface output devices 520, user interface input devices 522, and a network interface subsystem 516. The input and output devices allow user interaction with computer system 510. Network interface subsystem 516 provides an interface to outside networks and is coupled to corresponding interface devices in other computer systems.

User interface input devices 522 may include a keyboard, pointing devices such as a mouse, trackball, touchpad, or graphics tablet, a scanner, a touchscreen incorporated into the display, audio input devices such as voice recognition systems, microphones, and/or other types of input devices. In general, use of the term "input device" is intended to include all possible types of devices and ways to input information into computer system 510 or onto a communication network.

User interface output devices 520 may include a display subsystem, a printer, a fax machine, or non-visual displays such as audio output devices. The display subsystem may include a cathode ray tube (CRT), a flat-panel device such as a liquid crystal display (LCD), a projection device, or some other mechanism for creating a visible image. The display subsystem may also provide non-visual display such as via audio output devices. In general, use of the term "output device" is intended to include all possible types of devices and ways to output information from computer system 510 to the user or to another machine or computer system.

Storage subsystem 524 stores programming and data constructs that provide the functionality of some or all of the modules described herein. For example, the storage subsystem 524 may include the logic to perform selected aspects of method 300, 400, and/or to implement one or more of automated assistant 104, server device 102, voice to text engine 108, text parser engine 110, vehicle computing device 122, client computing device 130, assistant application 132, assistant application 124, assistant device 206, computing device 212, and/or any other application or device discussed herein.

These software modules are generally executed by processor 514 alone or in combination with other processors. Memory 525 used in the storage subsystem 524 can include a number of memories including a main random access memory (RAM) 530 for storage of instructions and data during program execution and a read only memory (ROM) 532 in which fixed instructions are stored. A file storage subsystem 526 can provide persistent storage for program and data files, and may include a hard disk drive, a floppy disk drive along with associated removable media, a CD-ROM drive, an optical drive, or removable media cartridges. The modules implementing the functionality of certain implementations may be stored by file storage subsystem 526 in the storage subsystem 524, or in other machines accessible by the processor(s) 514.

Bus subsystem 512 provides a mechanism for letting the various components and subsystems of computer system 510 communicate with each other as intended. Although bus subsystem 512 is shown schematically as a single bus, alternative implementations of the bus subsystem may use multiple busses.

Computer system 510 can be of varying types including a workstation, server, computing cluster, blade server, server farm, or any other data processing system or computing device. Due to the ever-changing nature of computers and networks, the description of computer system 510 depicted in FIG. 5 is intended only as a specific example for purposes of illustrating some implementations. Many other configurations of computer system 510 are possible having more or fewer components than the computer system depicted in FIG. 5.

In situations in which the systems described herein collect personal information about users (or as often referred to herein, "participants"), or may make use of personal information, the users may be provided with an opportunity to control whether programs or features collect user information (e.g., information about a user's social network, social actions or activities, profession, a user's preferences, or a user's current geographic location), or to control whether and/or how to receive content from the content server that may be more relevant to the user. Also, certain data may be treated in one or more ways before it is stored or used, so that personal identifiable information is removed. For example, a user's identity may be treated so that no personal identifiable information can be determined for the user, or a user's geographic location may be generalized where geographic location information is obtained (such as to a city, ZIP code, or state level), so that a particular geographic location of a user cannot be determined. Thus, the user may have control over how information is collected about the user and/or used.

While several implementations have been described and illustrated herein, a variety of other means and/or structures for performing the function and/or obtaining the results and/or one or more of the advantages described herein may be utilized, and each of such variations and/or modifications is deemed to be within the scope of the implementations described herein. More generally, all parameters, dimensions, materials, and configurations described herein are meant to be exemplary and that the actual parameters, dimensions, materials, and/or configurations will depend upon the specific application or applications for which the teachings is/are used. Those skilled in the art will recognize, or be able to ascertain using no more than routine experimentation, many equivalents to the specific implementations described herein. It is, therefore, to be understood that the foregoing implementations are presented by way of example only and that, within the scope of the appended claims and equivalents thereto, implementations may be practiced otherwise than as specifically described and claimed. Implementations of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present disclosure.

We claim:

1. A method implemented by one or more processors, the method comprising:
   receiving, at one or more input components of a client device during a dialog session between a user and an automated assistant, a request for an action to be performed by the automated assistant, wherein the automated assistant is configured to complete the action based on one or more slot values obtained from the user during the dialog session;
   detecting, at the client device, an event that occurs during the dialog session;
   determining a measure of importance of the event to the user;
   based on the measure of importance, classifying the event as an interruption and causing the one or more slot values obtained from the user during the dialog session to be stored in memory of the client device, wherein the stored one or more slot values are subsequently retrievable from the memory by the automated assistant in furtherance of completing the action; and
   subsequent to classifying the event, causing the automated assistant to provide a natural language prompt that reminds the user to complete the action, wherein the prompt is based on the stored one or more slot values.

2. The method of claim 1, further comprising:
   determining an activity that the user is actively engaged in during the dialog session;
   wherein the measure of importance of the event to the user is based at least on the activity that the user is actively engaged in during the dialog session.

3. The method of claim 1, wherein at least part of the automated assistant is implemented on a server device that is accessible to the client device over a network connection.

4. The method of claim 1, wherein the one or more slot values obtained from the user includes a natural language input received at an automated assistant interface of the client device, and the prompt identifies at least a portion of the natural language input.

5. The method of claim 1, wherein the one or more slot values are stored in a list with other information corresponding to other incomplete actions resulting from other dialog sessions.

6. The method of claim 1, further comprising:
   receiving a user input directing the automated assistant to further the action to completion; and
   generating, in response to receiving the user input, a user prompt that identifies one or more missing parameters necessary to complete the action.

7. The method of claim 1, wherein causing the one or more slot values for the action to be stored at the client device includes causing the one or more slot values to be stored with other slot values corresponding to incomplete actions initialized via the automated assistant.

8. The method of claim 1, wherein the one or more slot values are stored with a time interval that has transpired since the event occurred, or a time stamp that identifies when the event occurred.

9. A method implemented by one or more processors, the method comprising:
receiving, at one or more input components of a client device during a dialog session between a user and an automated assistant, a request for an action to be performed by the automated assistant, wherein the automated assistant is configured to complete the action based on one or more slot values obtained from the user during the dialog session;
detecting, at the client device, an event that occurs during the dialog session;
determining a measure of importance of the event to the user;
based on the measure of importance, classifying the event as an interruption and causing the one or more slot values obtained from the user during the dialog session to be stored in memory of the client device, wherein the stored one or more slot values are subsequently retrievable from the memory by the automated assistant in furtherance of completing the action; and
subsequent to classifying the event, causing the automated assistant to provide a prompt to the user regarding completing the action, wherein the prompt is based on the stored one or more slot values and is presented at a graphical user interface rendered on a display of the client device or at a speaker of the client device, and wherein the prompt includes a list of multiple previously incomplete and selectable actions originating from previous dialog sessions between the user and the automated assistant.

10. A method implemented by one or more processors, the method comprising:
receiving, at one or more input components of a client device during a dialog session between a user and an automated assistant, a request for an action to be performed by the automated assistant, wherein the automated assistant is configured to complete the action based on one or more slot values obtained from the user during the dialog session;
determining an activity that the user is actively engaged in during the dialog session;
detecting, at the client device, an event that occurs during the dialog session;
determining a measure of importance of the event to the user based at least on the activity that the user is actively engaged in during the dialog session;
based on the measure of importance of the event to the user, classifying the event as an interruption to the dialog session;
based on the classifying, causing the one or more slot values obtained from the user during the dialog session to be stored in memory of the client device, wherein the stored one or more slot values are subsequently retrievable from the memory by the automated assistant in furtherance of completing the action; and
subsequent to classifying the event, causing the automated assistant to provide a prompt to the user regarding completing the action, wherein the prompt is based on the stored one or more slot values.

11. The method of claim 10, further comprising:
receiving, at one or more of the input components of the client device, a separate request to perform another action, wherein causing the automated assistant to provide the prompt includes generating a response to the separate request, wherein the response to the separate request identifies the action as a reminder to complete the action.

12. The method of claim 10, wherein the one or more slot values obtained from the user includes a natural language input received at an automated assistant interface of the client device, and the prompt identifies at least a portion of the natural language input.

13. The method of claim 10, wherein the prompt is presented at a graphical user interface rendered on a display of the client device and includes a list of previously incomplete actions originating from previous dialog sessions between the user and the automated assistant.

14. The method of claim 10, wherein the activity comprises driving, the client device comprises an in-vehicle computing device, and determining the measure of importance of the event to the user includes determining that the event relates to driving.

15. The method of claim 10, wherein the one or more slot values are is stored in a list with other information corresponding to other incomplete actions resulting from other dialog sessions.

16. A method implemented by one or more processors of an in-vehicle computing device of a vehicle, the method comprising:
receiving data corresponding to a dialog session between a user and an automated assistant that occurs while the user is driving the vehicle, wherein the data corresponds to slot values for an action to be performed by the automated assistant, and the user interacts with the automated assistant via an automated assistant interface of the in-vehicle computing device;
classifying an event that occurs during the dialog session based on a measure of importance of the event to operation of the vehicle by the user;
based on the event being classified as an interruption to the dialog session occurring between the user and the automated assistant:
at least temporarily stopping the dialog session from continuing, and
causing the slot values for the action to be stored at the in-vehicle computing device as a set of data that further identifies missing parameters needed to complete the action, wherein the set of data is configured to be subsequently retrieved in furtherance of completing the action;
subsequent to at least temporarily stopping the dialog session from continuing, causing the client device to provide natural language output that reminds the user to complete the action, wherein the natural language output is based on the stored set of data.

17. The method of claim 16, further comprising:
receiving a user input directing the automated assistant to further the action to completion; and
generating, in response to receiving the user input, a user prompt that identifies one or more of the missing parameters.

18. The method of claim 16, wherein causing the slot values for the action to be stored at the in-vehicle computing device as the set of data includes causing the set of data to be stored with other sets of data corresponding to incomplete actions initialized via the automated assistant.

19. The method of claim 16, wherein the set of data includes an amount of time that has transpired since the event occurred, or a time stamp that identifies when the event occurred.

* * * * *